United States Patent [19]
Zimmer et al.

[11] 3,933,197
[45] Jan. 20, 1976

[54] CONTROL OF HEATING AND COOLING AVAILABLE FROM CENTRAL SOURCES TO A MULTI-ZONE TEMPERATURE CONTROLLED SPACE

[75] Inventors: Darrel E. Zimmer, North Park; Paul H. Brace, Rockford, both of Ill.

[73] Assignee: Barber-Colman Company, Rockford, Ill.

[22] Filed: May 16, 1974

[21] Appl. No.: 470,567

[52] U.S. Cl. .................... 165/2; 165/22; 165/27; 236/46 R
[51] Int. Cl.² ............................................. F25B 13/00
[58] Field of Search .................. 165/22, 29, 27, 12; 236/46 R, 1 C

[56] References Cited
UNITED STATES PATENTS

| | | | |
|---|---|---|---|
| 3,724,534 | 4/1973 | Weatherston | 165/22 |
| 3,785,432 | 1/1974 | Kabat et al. | 165/22 |

*Primary Examiner*—Albert W. Davis, Jr.
*Assistant Examiner*—James D. Liles
*Attorney, Agent, or Firm*—A. Richard Koch

[57] ABSTRACT

Incremental heating and cooling sources are energized and deenergized as required to meet the maximum heating and cooling demands of any of the zones in a temperature controlled space. Common references and comparators are employed for both heating and cooling controls.

8 Claims, 8 Drawing Figures

3,933,197

CONTROL OF HEATING AND COOLING AVAILABLE FROM CENTRAL SOURCES TO A MULTI-ZONE TEMPERATURE CONTROLLED SPACE

BACKGROUND OF THE INVENTION

This invention is concerned with automatic control of heating and cooling available from a central heating and cooling system as required to meet the maximum heating and cooling demands from a plurality of temperature controlled zones.

In heating and cooling a plurality of rooms or other zones from a central heating and cooling source, some zones have different requirements than others. The heating and cooling demands in zones along an exposed wall of a building will vary with outside air temperature, the position of the sun, direction and velocity of wind, the window area, the insulating properties of the wall, the use of the space comprising the zone, and the personal preferences of the occupants. Interior zones are insulated by the exterior zones from the effects of outside temperature, sun, wind, window area, and wall insulation. They usually demand only cooling to remove heat generated by lights, persons and other heat producers. Exterior zones may require either heating or cooling dependent upon prevailing conditions. As a result of these differing requirements, it has been found necessary, when a central heating and cooling system is employed, to make both heating and cooling available to the individual zones at the same time.

A preferred method for modulating the temperature in the zones involves making both heating and cooling media available to each zone and mixing the media in proportions determined by the temperature deviation from the setpoint in the zone, the flow of mixed media being held substantially constant. In some systems the temperatures of the heating and cooling media has been controlled by the zones having the greatest demand for heating and cooling respectively. In the past, after the zone with the greatest demand for heating had been determined, a heating media control system regulated the temperature of the heating media to produce the required correction in that zone when only heating media was being delivered thereto. An entirely separate cooling media control system operated in similar manner to meet the requirements of the zone with the greatest cooling demand.

SUMMARY OF THE INVENTION

According to the present invention the heating and cooling media control systems are not independent, but utilize common components. The media control systems increase and decrease the temperatures of the media in predetermined increments. The incremental changes may occur in timed sequence. Analog techniques are employed in the early stages and digital techniques in later stages of the control. The hot deck temperature is reset as a function of greatest heat demand. The mixed air temperature is reset as a function of greatest cooling demand. Both hot and cold deck temperatures may be reset by a power demand limit. The amount of outside air used may be adjusted according to its enthalpy.

DESCRIPTION OF THE PREFERRED EMBODIMENT

Figure 1:
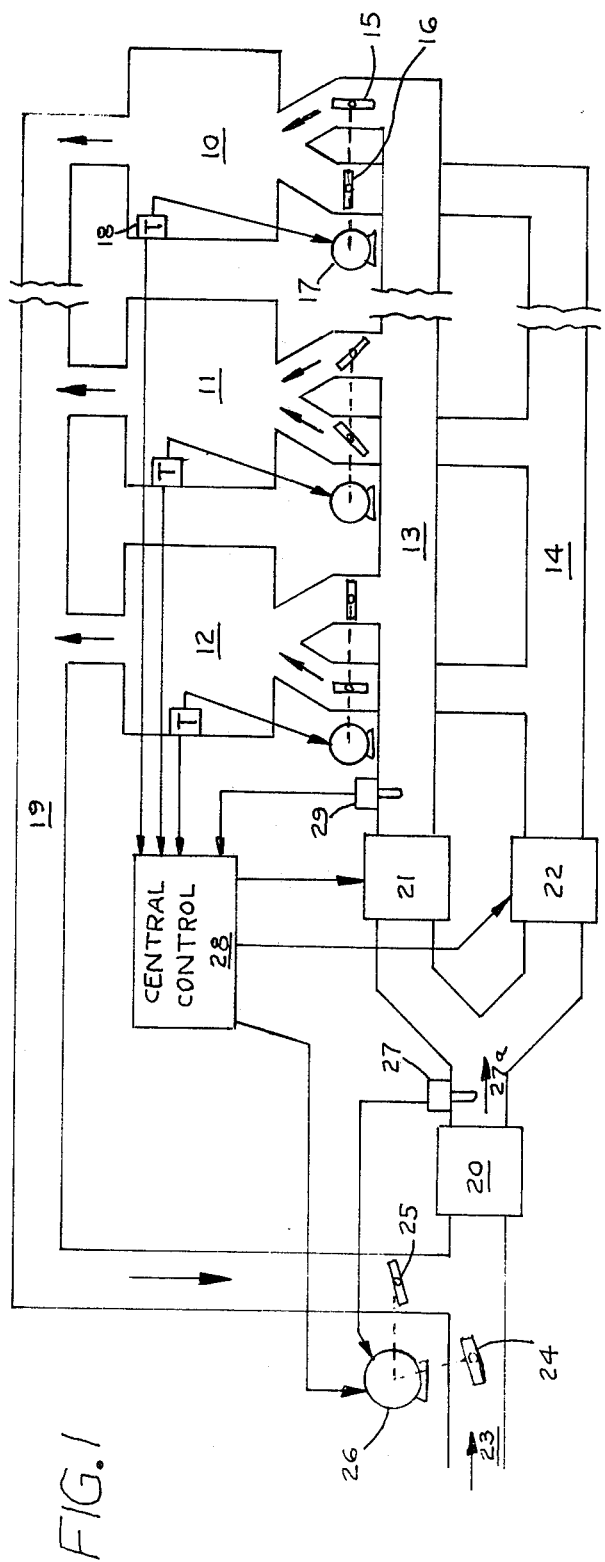
FIG. 1 is a schematic view of a typical multi-zone heating-cooling system to which this invention may be applied.
Figure 3:
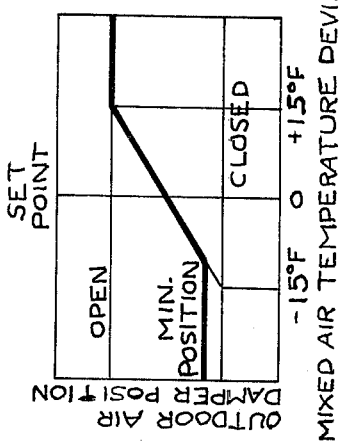
FIG. 3 is a graph showing how the position of the outdoor air damper varies with mixed air temperature.
Figure 2:
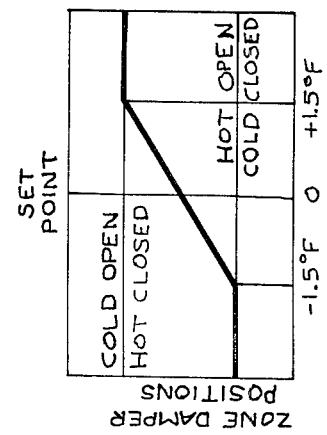
FIG. 2 is a graph showing how the hot and cold damper positions vary with the zone temperature.

FIG. 1 shows a plurality of zones such as 10, 11, 12 as separate rooms although this is not necessary. For convenience we will assume the time is during the heating season, that zone 10 is the exterior room requiring the greatest amount of heat to replace that lost through conduction and radiation to the outside, that zone 12 is the interior room requiring the greatest amount of cooling to remove heat generated by its occupants, lights, machinery, etc., and that zone 11 has intermediate requirements. Heat is available to each zone from a hot deck 13 and cooling is available to each zone from a cold deck 14. The amount of heat and cooling supplied to each zone is controlled by dampers such as 15, 16 controlling air flow from the hot and cold decks respectively into the controlled zone such as 10. These dampers are reversely positioned by a reversible motor 17 under control of a zone thermostat 18. FIG. 2 shows how the damper positions vary with temperature deviation. Air is exhausted from each zone through a return air duct 19. Circulation is provided by a fan 20 moving the return air through heat exchangers 21, 22 to the hot and cold decks 13, 14 respectively. Ventilation and perhaps cooling is supplied by outside air delivered through an intake 23 and mixed with the return air. The proportions of outside and return air being mixed are determined by outside and return air dampers 24, 25 positioned reversely by a reversible motor 26 under the control of a mixed air thermostat 27. FIG. 3 shows how the outdoor air damper position varies with deviation of mixed air temperature from a set point. In many installations a minimum open position of the damper 24 is required to be maintained to assure sufficient ventilation. The return air damper 25 is closed when outdoor air damper 24 is open and open when the latter would be closed. There is no return air minimum position. The amount of heating supplied to the hot deck 13 is determined through a central control 28 by the zone (10 in this example) having the greatest heat demand and a hot deck temperature sensor 29. The amount of cooling supplied to the cold deck 14 is determined by the zone (12 in this example) having the greatest cooling demand through the central control 28. The central control also resets the mixed air temperature by limited control over the damper motor 26.

METHOD

Figure 4:
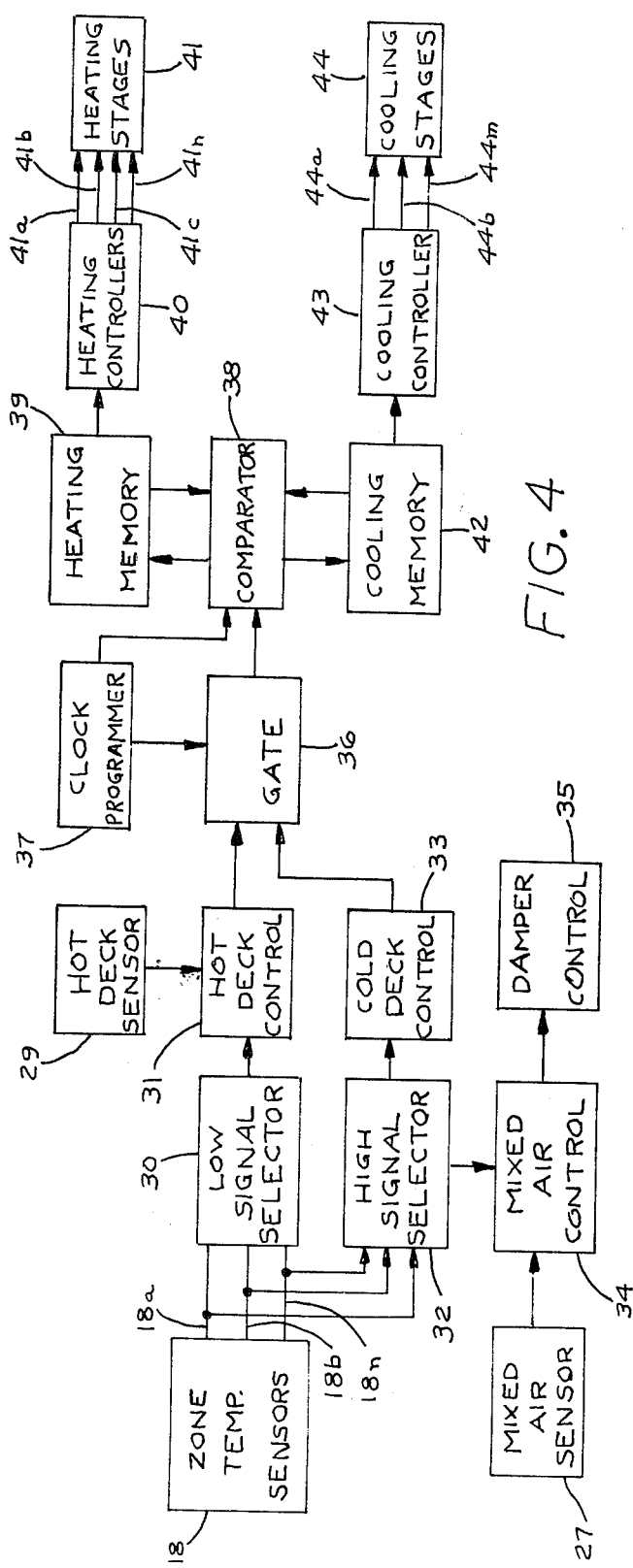
FIG. 4 is a block diagram of a central control in accordance with this invention.

In the central control 28 as seen in FIG. 4, the zone temperature sensors 18 each provide an input over respective lines 18a, 18b, . . . 18n to a low signal selector 30, which selects the lowest input as representative of the heat requirement of the zone (10 in FIG. 1) having the greatest heating demand. This lowest input is delivered to a hot deck control 31, which combines it with a signal from hot deck sensor 29 to control the hot deck temperature. Each of the zone temperature sensors 18 also provides an input to a high signal selector 32, which selects the highest input as representative of the cooling requirement of the zone (12 in FIG. 1) having the greatest cooling demand. This highest input is delivered to a cold deck control 33 to control the amount of mechanical cooling supplied by heat exchanger 22 to the cold deck 14. The highest input is also delivered to a mixed air control 34 where it resets the control by the mixed air thermostat 27 of the damper control 35. The hot and cold deck controls 31, 33 do not directly control the heating and cooling of air in the hot and cold decks 13, 14. Signals from the hot and cold deck controls are fed to an analog gate 36 controlled by a clock programmer 37 to pass alternately as a single demand signal the signals from the hot and cold deck controls to a comparator 38, which determines whether an increase or a decrease in the available heating or cooling is required. Determinations of the comparator pertaining to available heating are transferred to a heating memory 39, which sequentially increases or decreases the number of its output signals to heating controllers 40 that energize and deenergize the heating stages 41. Determinations of the comparator pertaining to available cooling are transferred to a cooling memory 42 which sequentially increases or decreases the number of its output signals to cooling controllers 43 that energize and deenergize the cooling stages 44. Both heating and cooling memories 39, 42 provide feedbacks to the comparator 38 to reset the reference values employed.

Figure 5:
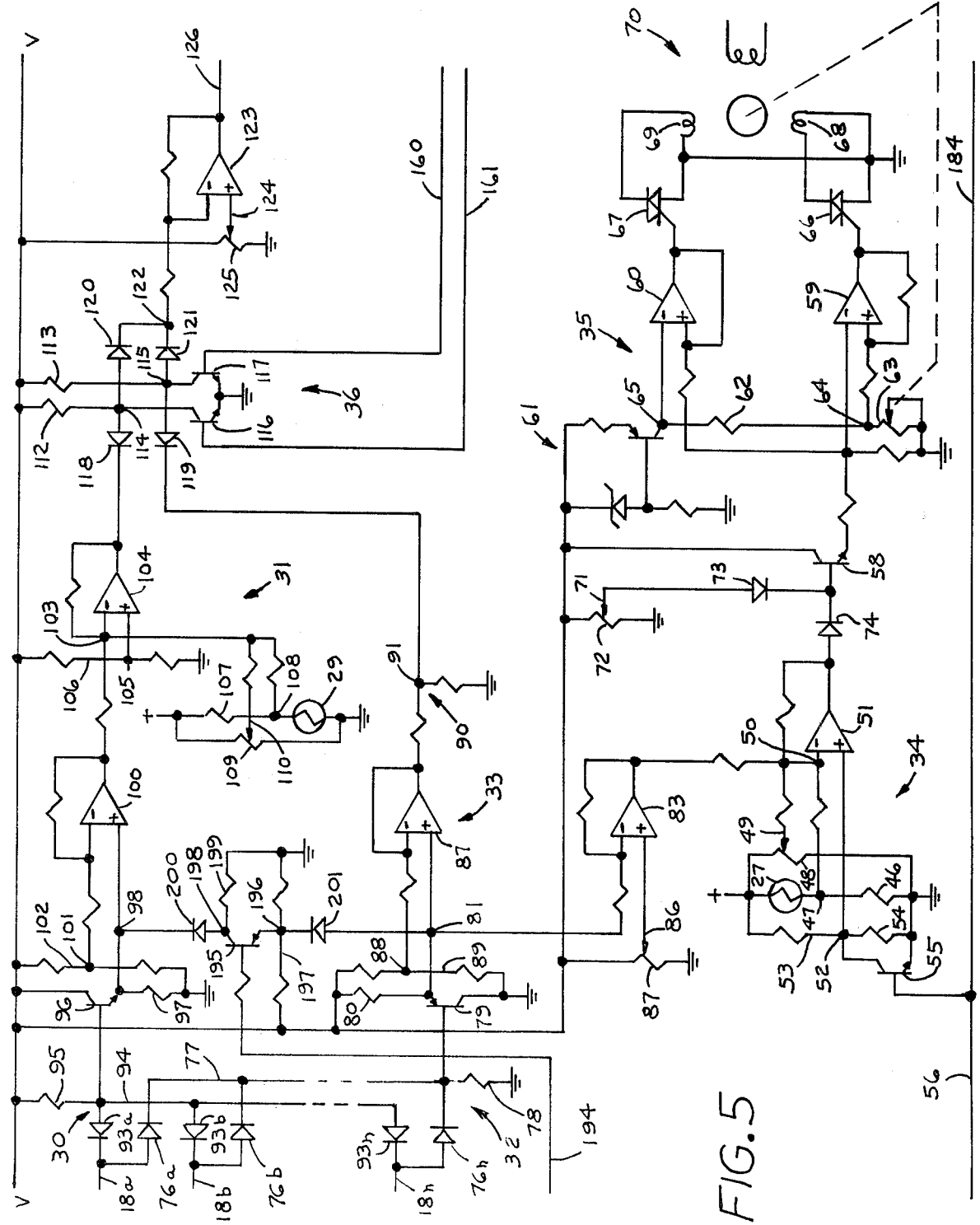
FIG. 5 and 6 together are a circuit diagram of a central control in accordance with this invention.
Figure 6:
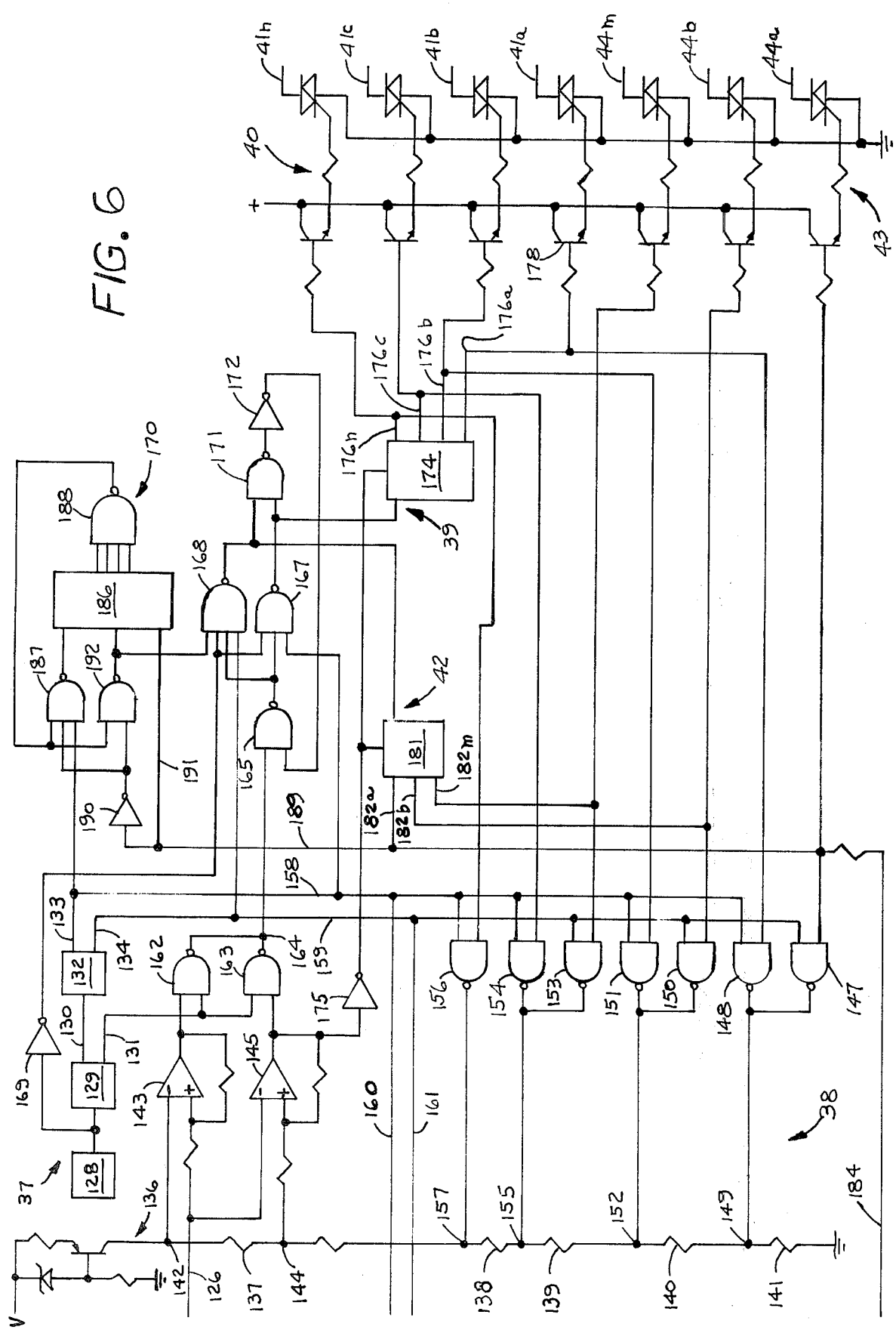

Apparatus to employ this method is shown in FIGS. 5 and 6 and described later. It will be seen that the FIG. 5 portion employs analog techniques and the FIG. 6 portion employs digital techniques.

MIXED AIR CONTROL 34

As seen in FIG. 5, a heat sensitive resistor 27 in the mixed air is connected in series with a fixed resistor 46 between a direct voltage source + and ground to produce at junction 47 a voltage as a function of mixed air temperature. A potentiometer 48 connected between the same voltage source + and ground provides at its wiper 49 a voltage as a function of a selected nominal set point. These mixed air temperature and set point voltages are coupled to summing point 50 at the inverting terminal of an inverting amplifier 51. The input signal provided is proportional to the difference between the measured and set point mixed air temperatures and of a polarity determined by the sense of the deviation. The non-inverting terminal of the amplifier is connected to a fixed tap 52 on a voltage divider 53 between the same voltage source + and ground to provide a base voltage. As the enthalpy of outdoor air rises, it is less effective as a cooling agent and finally becomes useless. It is under these circumstances desirable to limit the amount of outdoor air mixed with the return air. This may be accomplished by shunting the lower portion 54 of voltage divider 53 with an NPN transistor 55 controlled by an enthalpy on-off input delivered to its base through an enthalpy input line 56.

DAMPER CONTROL 35

The output of inverting amplifier 51 is fed into the base of an NPN transistor 58, the collector of which is connected to a DC power supply V while the emitter is coupled to ground, to the inverting terminal of a positive feedback inverting amplifier 59 and to the non-inverting terminal of a positive feedback non-inverting amplifier 60. A constant current generator 61 supplies current to a fixed resistor 62 and a feedback potentiometer 63 connected in series between the generator and ground. The non-inverting terminal of amplifier 59 is coupled to the junction 64 between resistor 62 and potentiometer 63, while the junction 65 between generator 61 and resistor 62 is connected to the inverting terminal of amplifier 60. The resistor 62 thus establishes a fixed dead band between the operating points of the amplifiers. The outputs of amplifiers 59, 60 are coupled to gate terminals of triacs 66, 67 respectively. As shown these triacs selectively close the shading coils 68, 69 of a reversing shaded-pole motor 70 which controls the position of dampers 24, 25 in the outside and return air ducts 23, 19 respectively and resets the feedback potentiometer 63. The motor 70 is connected to open the outdoor air damper 24 and close the return air damper 25 as the sensed temperature of the mixed air increases. A minimum outdoor air position for the damper 24 may be established by the setting of wiper 71 on a minimum outdoor air set point potentiometer 72 connected between power supply V and ground. The wiper is coupled to the base of transistor 58 through a diode 73, which along with diode 74 between the output of amplifier 51 and the base of transistor 58 forms a highest signal selector.

HIGH SIGNAL SELECTOR 32

The incoming lines 18a, 18b, . . . 18n are connected through respective forward connected diodes 76a, 76b, . . . 76n to a bus 77, which is coupled to ground through a resistor 78 and to the base of a PNP transistor 79 connected in emitter follower configuration with a resistor 80 between the emitter and power supply. All of the diodes 76a, 76b, . . . 76n, except that one conducting current from the line 18a, 18b, . . . or 18n at the highest potential, will be back biased. The forward voltage drop in the emitter-base circuit of transistor 79 will be substantially the same as in each of the diodes 76a, 76b, . . . 76n, so that the voltage at the summing point 81 is substantially identical to that of that line 18a, 18b, . . . or 18n at the highest potential.

The mixed air control 34 is reset to a limited extent by the demand for cooling as indicated by the variable output at the summing point 81. The summing point is coupled to the inverting input terminal of an inverting amplifier 83. The non-inverting input terminal is coupled to the wiper 84 of a potentiometer 85 connected between power supply V and ground. The output of amplifier 83 is coupled to the summing point 50. This results in more outside air being drawn in as the demand for cooling increases.

COLD DECK CONTROL 33

The cold deck control comprises a non-inverting amplifier 87, having its non-inverting input terminal coupled to summing point 81 and its inverting input terminal coupled to a fixed tap 88 on voltage divider 89 connected between power supply V and ground. The output of amplifier 87 is connected to ground through an output voltage divider 90 having a fixed tap 91. This output voltage divider is not required if the numbers of heating and cooling stages are equal. If there are more cooling than heating stages it would be inserted at the output of the hot deck control 31 instead.

LOW SIGNAL SELECTOR 30

The incoming lines 18a, 18b, . . . 18n are connected through respective reverse connected diodes 93a, 93b, . . . 93n to a bus 94, which is coupled to power supply v through a resistor 95 and to the base of an NPN transistor 96 connected in emitter follower configuration between power supply v and ground, with a resistor 97 between its emitter and ground. All of the diodes 93a, 93b, . . . 93n, except that one conducting current from the line 18a, 18b, . . . or 18n at the lowest potential, will be back biased. The forward voltage drop in the base-emitter circuit of transistor 96 will be substantially the same as in each of the diodes 93a, 93b, . . . 93n, so that the voltage at the summing point 98 is substantially identical to that of that line 18a, 18b, . . . or 18n at the lowest potential.

HOT DECK CONTROL 31

The summing point 98 is coupled to the non-inverting input terminal of a non-inverting amplifier 100, having its inverting input terminal coupled to a fixed top 101 on voltage divider 102 connected between power supply V and ground. The output of amplifier 100 is connected to a summing point 103 at the inverting input terminal of an inverting amplifier 104. The non-inverting input terminal of the amplifier is connected to a fixed tap 105 on a voltage divider 106 connected between power supply V and ground. A heat sensitive resistor 29 in hot deck 13 is connected in series with a fixed resistor 107 between a direct voltage source + and ground to produce at junction 108 a voltage as a function of hot deck temperature. A potentiometer 109 connected between the same voltage source + and ground provides at its wiper 110 a voltage as a function of a selected hot deck set point. These hot deck temperature and set point voltages are coupled to summing point 103. The input signal provided is proportional to the difference between the measured and set point hot deck temperatures and of a polarity determined by the sense of the deviation.

Gate 36

Resistors 112, 113 are connected between the power supply V and junction 114, 115 at the collectors of NPN transistors 116, 117 respectively. The emitters of the transistors are grounded so that the transistor-resistor combinations are in parallel paths. The bases of the transistors are alternately energized by the clock programmer 37, as will be described later. The output of amplifier 104 is coupled through a reverse connected diode 118 to junction 114 and the fixed tap 91 is coupled through another reverse connected diode 119 to collector 115. The collectors 114, 115 are coupled through diodes 120, 121 respectively to a summing point 122. The amplifiers 104, 87 are such that they hold their output steady regardless of load. When no control signal is applied to the base of transistor 116, the voltage at its collector 114 is equal to the output voltage of amplifier 104 plus the forward voltage drop of diode 118. This collector voltage minus the forward voltage drop of diode 120 appears at summing point 122. Since the forward voltage drops of the diodes 118, 120 are substantially identical, the voltage at the summing point 122 is substantially the same as at the output of amplifier 104. When a control signal is applied to the base of the transistor 116, the voltage at its collector 114 is equal only to the voltage drop in the transistor. Since the transistor acts as a gate, its voltage drop is substantially the same as the forward voltage drop in diode 120, so the voltage at summing point 122 would be substantially zero, if dependent solely upon conduction by transistor 116. In like manner it can be shown that the summing point voltage would be equal to the voltage at tap 91 when transistor 117 is not conducting and substantially zero when transistor 117 is conducting, if dependent solely upon conduction by transistor 117. The diodes 120, 121 act as a highest voltage selector, the diode connected to the collector having a lower voltage than the other being back biased and so non-conducting. The summing point voltage is inverted and calibrated by an inverting amplifier 123, the non-inverting terminal of which is connected to wiper 124 of a potentiometer 125 between the power supply V and the ground. The output of amplifier 123 is supplied to line 126 as an analog signal varying according to the maximum demand for heating and cooling alternately.

CLOCK PROGRAMMER 37

As seen in FIG. 6, a clock 128 provides periodic pulses to interconnected J and K terminals of a J-K flip-flop 129, producing alternating complementary 0 and 1 signals at the Q and $\overline{Q}$ terminals 130, 131 at half of the frequency of the clock pulses. The flip-flop 129 therefore serves as a frequency divider and will hereinafter be referred to as such. Another J-K flip-flop 132 receives its J and K inputs from Q terminal 130 and acts as a second frequency divider, producing alternating complementary 0 and 1 signals at Q and $\overline{Q}$ terminals 133, 134 at a quarter of the frequency of the clock pulses.

Comparator 38

As shown in FIG. 6, a constant current generator 136 delivers current through series connected resistors 137–141 to ground with resistor 141 connected to ground. Junction 142 at the upper end of resistor 137 is connected to the inverting terminal of a non-inverting positive feedback amplifier 143, the non-inverting terminal of which is coupled to line 126. When the output of amplifier 123 delivered by line 126 exceeds the voltage at junction 142, a saturated positive output (a digital 1) appears at the output terminal of amplifier 143. This occurs only when an increase in available heating or cooling is required. At all other times the output of amplifier 143 is zero (0). Junction 144 at the lower end of resistor 137 is coupled to the non-inverting terminal of an inverting positive feedback amplifier 145, the inverting terminal of which is connected to line 126. When the output of amplifier 123 delivered by line 126 falls below the voltage at junction 144, a saturated positive output (a digital 1) appears at the output terminal of amplifier 145. This occurs only when a decrease in available heating or cooling is required. At all other times the output of amplifier 145 is zero (0). When the outputs of both amplifiers 143, 145 is 0, no change is required. The resistor 137, by establishing separate reference voltages for amplifiers 143, 145, determines the deadband between their operating points.

The resistors 138–141 are equal in number to the greatest of the number of heating or cooling stages 41, 44 being controlled. The resistors 138-141 are of equal fixed value. A pair of NAND gates 147, 148 have their outputs connected to junction 149 between resistors 140, 141 so that simultaneously and alternately with respect to NAND gates 148, 151, 154, 156. The other 1 inputs to NAND gates 147, 150, 153 are received respectively as the cooling stages 44 are energized, as will be explained later. It will be seen that the reference voltage at junctions 142, 144 are reset lower by equal increments as the resistors 141–138 are sequentially shorted. The demand for an increase in heating or cooling must therefore be that much greater in order to produce a 1 output from amplifiers 143, 145.

The Q terminal 133 also energizes the base of transistor 117 through conductors 158, 160, so that heating control signals are received over line 126 while the NAND gates 148, 151, 154, 156, corresponding to heating stages resistor 141 is shorted whenever either of the NAND gates produces a 0 output. NAND gates 150, 151, with their outputs connected to junction 152, may similarly short resistor 140. NAND gates 153, 154, with outputs connected to junction 155, are adapted to short out resistor 139. Lastly NAND gate 156 with its output connected to junction 157 is enabled to short resistor 138. The NAND gates 148, 151, 154, 156 receive one of their 1 inputs from Q terminal 133 through conductor 158, so that all of them are enabled periodically and simultaneously. The other 1 inputs to NAND gates 148, 151, 154, 156 are received respectively as the heating stages 41 are energized, as will be explained later. The NAND gates 147, 150, 153 receive one of their 1 inputs from $\overline{Q}$ terminal 134 through conductor 159, so that they are enabled 41a, b, c, n respectively, are enabled. The $\overline{Q}$ terminal 134 also energizes the base of transistor 116 through conductors 159, 161, so that cooling control signals are received over line 126 while the NAND gates 147, 150, 153, corresponding to cooling stages 44a, b, m respectively, are enabled.

A NAND gate 162 receives as one input the output of amplifier 143. A NAND gate 163 receives the output of amplifier 145 as one input. The other input to each of the NAND gates 162, 163 is provided by $\overline{Q}$ terminal 131, so that both are enabled simultaneously. The outputs of NAND gates 162, 163 are joined at junction 164, where they provide an input to NAND gate 165. This input will be a 1 except when a change in available heating or cooling is called for and then only while a 1 is present at $\overline{Q}$ terminal 131, at which time junction 164 is grounded to provide a 0.

HEATING MEMORY 39

The output of NAND gate 165 is delivered as an input to each of NAND gates 167, 168. If the other input to NAND gate 165 is a 1 when a 1 appears at junction 164, the outputs of both NAND gates 167, 168 will be a 1. NAND gate 167 receives another input from Q terminal 133 through conductor 158, while NAND gate 168 receives an input from $\overline{Q}$ terminal 134 through conductor 159. Since the outputs at terminals 133, 134 are complementary, one or the other of the NAND gates 167, 168 will be producing a 1 output at all times. Each of NAND gates 167, 168 also receives an input from clock 128 through an inverter 169. Because the clock output is a periodic 1 pulse, the inverter 169 will provide a 1 to the NAND gates except for the brief pulse time when a 0 is delivered to the NAND gates, thus assuring a 1 output from both NAND gates for that brief period. A delay circuit 170, described later, also provides an input to NAND gate 168. The outputs of both NAND gates 167, 168 are delivered to NAND gate 171 as inputs. The output of NAND gate 171 is supplied as an input to NAND gate 165 through an inverter 172. Since the outputs of both NAND gates 167, 168 can be 1s only during the brief clock pulse, a 1 input can be delivered to NAND gate 165 only during that period. This results in a 0 output from NAND gate 165 and insures that only one 0 pulse is delivered by NAND gates 167, 168.

Since Q terminal 133 simultaneously supplies a 1 to both the base of transistor 117 and NAND gate 167, the heating demand signal will be passed by gate 36 only while NAND gate 167 is enabled to produce a 0 output. In like manner the cooling demand signal will be passed only while NAND gate 168 is enabled to produce a 0 output. NAND gates 167, 168 are therefore responsive to heating and cooling demands respectively.

The heating right-left shift register 174 shifts upon receipt of a 0 from NAND gate 167. The direction of the shift depends upon a mode control signal received from the inverting positive feedback amplifier 145 through an inverter 175. As previously explained amplifier 145 produces a 1 output when a decrease in available heating or cooling may be made — otherwise the output is 0. It will be seen that after inversion there will be a 1 delivered as a mode control signal to shift register 174 when no decrease in demand for available heating or cooling is indicated and a 0 will be delivered when a decrease in demand for available heating or cooling is indicated. When there is a demand for increased available heating there will be a 1 mode control signal present when a 0 shift signal is received from NAND gate 167. This will result in a 1 output being continuously produced at an additional output terminal 176 of shift register 159. When there is a demand for decreased available heating, there will be a 0 mode control signal present when a 0 shift signal is received from NAND gate 167. This will result in a 1 output being removed from one of the output terminals 176. The output terminals 176a, b, c, n have 1 output signals produced in fixed sequence — 176a being first to produce a 1 output and 176n being last. The 1s are removed in reverse order. The number of output terminals 176 provided must at least equal the number of heating stages 41 to be controlled.

The output terminals 176a, b, c, n are connected as inputs to NAND gates 148, 151, 154, 156 respectively, so that as the outputs are sequentially energized the gates sequentially short the resistors 141–138 to reset the reference voltages of the positive feedback amplifiers 143, 145, as previously explained.

Heating Controllers 40

The heating controllers 40 receive the outputs from the heating shift register 174, the output from each of the terminals 176a, b, c, n controlling respective ones of the heat controllers. Since all of the heating controllers are identical, only one will be described. The output terminal 176a is coupled to the base of an NPN transistor 178 which has its collector joined to a positive voltage source +. The emitter is coupled to the gate of a triac 179 in series between one of the heating stages 41, as by line 41a, and ground to control the closing and opening of the heating stage circuit.

Cooling Memory 42

The cooling right-left shift register 181 shifts upon receipt of a 0 from NAND gate 168. The direction of the shift depends upon the mode control signal received from the inverting positive feedback amplifier 145 as in the heating memory 39. When there is a demand for increased cooling there will be a 1 mode control signal present when a 0 shift signal is received from NAND gate 168. This will result in a 1 output being continuously produced at an additional output terminal 182. When there is a demand for decreased available heating, there will be a 0 mode control signal present when a 0 shift signal is received from NAND gate 168. This will result in a 1 output being removed from one of the output terminals 182. The output terminals have 1 output signals produced in fixed sequence — 182a being first and 182m being last. The 1s are removed in reverse order. The number of output terminals must at least equal the number of cooling stages 44 to be controlled.

Figure 7:
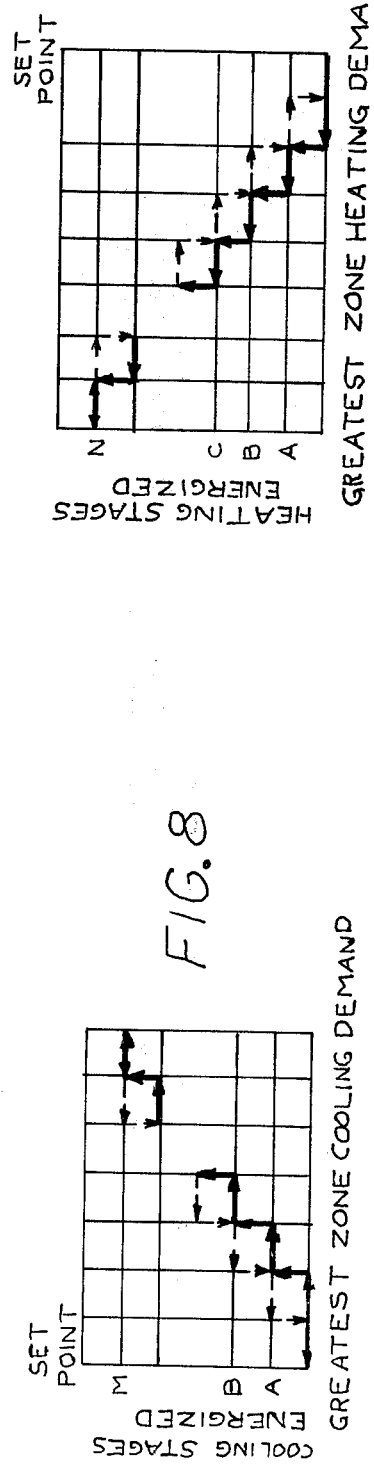
FIG. 7 is a graph showing how heating stages are energized in response to the greatest demand for heating.

A 1 appearing at output terminal 182a, or any other desired output terminal 182, is coupled to the base of transistor 55 through line 184 to disable the mixed air control 34 and cause the outside air damper 24 to assume its minimum open position when the cooling stage 44 energized in response to a 1 at the selected output terminal is energized. FIG. 7 shows how the heating stages are energized and de-energized as the heating demand increases and decreases.

Cooling Controllers 43

Figure 8:
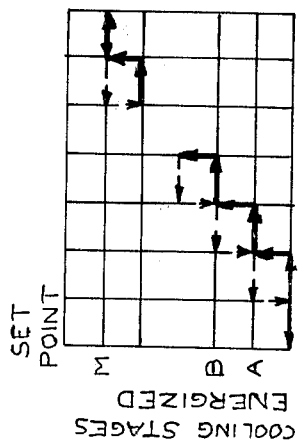
FIG. 8 is a graph showing how cooling stages are energized in response to the greatest demand for cooling.

The cooling controllers 43 are identical to heating controllers 40, so they will not be separately described. It will be noted that the cooling stages 44 are energized through lines 44a, b, m as a result of continuous 1s appearing at output terminals 182a, b, m, respectively. FIG. 8 shows how the cooling stages are energized and de-energized as the cooling demand increases and decreases, the solid lines showing increasing demand and the dashed lines showing decreasing demand.

Delay Circuit 170

In the delay circuit 170 a binary counter 186 receives trigger signals from NAND gate 187. The outputs of counter 186 provide all of the inputs to a NAND gate 188, so that the latter normally supplies a 1 output as an input to NAND gate 187—a 0 being supplied only when the counter is full. A second 1 input to NAND gate 187 is periodically provided by the output from Q terminal 133. NAND gate 187 would then provide a periodic falling trigger signal to increase the count whenever the input from Q terminal 133 changed from 0 to 1 until the count was full, at which time trigger signals would cease. Provision of a trigger signal is also inhibited whenever cooling is being supplied. When a 1 is produced at output terminal 182a to energize the first cooling stage 44 through line 44a, the 1 is also delivered by conductor 189 to inverter 190, which then supplies a 0 as an input to NAND gate 187 to prevent a 0 output therefrom. The counter 186 receives a reset signal from output terminal 182a through conductors 189, 191 and another from NAND gate 192. Reset of the count to 0 is accomplished when both reset signals become 1s. The reset signal from output terminal 182a is 1 as long as any cooling stage is energized. The reset signal from NAND gate 192 becomes 1 only when there is a full count in counter 186 while a cooling stage is energized. The output of NAND gate 192 is also delivered on an input to NAND gate 168, as previously mentioned, so that the latter can provide a 1 output only when the count is full.

If the clock 128 provides a pulse every 5 seconds, the frequency divider 129 will provide an output change every 10 seconds and frequency divider 132 will change output every 20 seconds. If a 16 count binary counter 186 is employed, it will produce a full count every 320 seconds or approximately every 5 minutes. Since NAND gate 168 can supply a 0 input to shift register 181 only when all inputs to NAND gate 168 are 1s, it will be seen that shift register 181 can energize and de-energize cooling stages 44 only at approximately 5 minute intervals.

Power Demand Limit

It is sometimes necessary or desirable to limit the amount of power drawn from supply lines. This may result from the size of the conductors, from peak load premiums, or other considerations. Provision is made for reducing the power drawn for heating and cooling to meet such requirements. A DC power demand signal received over conductor 194 is delivered to the base of a PNP transistor 195, the emitter of which is connected to tap 196 of a voltage divider 197 connected between power supply V and ground. The collector of transistor 195 at junction 198 is connected to ground through a resistor 199 and to the summing point 98 through diode 200. The tap 196 is connected through diode 201 to summing point 81.

When a power demand signal appears on conductor 194, transistor 195 conducts current from emitter to collector in proportion to the difference between the voltage at tap 196 and the conductor 194. This current reduces the voltage at tap 196 and increases the voltage at junction 198. If the voltage at tap 196 is lower than at summing point 81, diode 201 will become conductive, lowering the voltage at summing point 81 to substantially the voltage at tap 196 and thus overriding the greatest cooling demand. If the voltage at junction 198 is higher than at summing point 98, diode 200 will become conductive, raising the voltage at summing point 98 and thus overriding the greatest heating demand. The power demand signal could be at a fixed or variable DC voltage and could be controlled manually or automatically as in response to a power consumption measurement.

CONCLUSION

The control above described is merely a preferred embodiment of the invention, the scope of which is defined by the claims. It will be obvious to those skilled in the art that many variations, substitutions, etc. may be made in the described circuit without changing the inventive concept.

We claim:

1. A method for automatically controlling the amounts of heating and cooling simultaneously available from a central location to heat and cool a plurality of temperature controlled zones, said method comprising the steps of determining separately the representative heating and cooling demands of said zones, comparing said heating and cooling demands alternately with respective reference values provided by a single means, controlling the amount of heat available as a function of the result of said heating demand comparison, and controlling the amount of cooling available as a function of the result of said cooling demand comparison.

2. A method according to claim 1 additionally comprising the steps of resetting the heating reference value in response to the amount of heat available during said heating demand comparison, and resetting the cooling reference value in response to the amount of cooling available during said cooling demand comparison, both of said resetting steps being accomplished by a common means.

3. A method according to claim 1 whereby said amounts of heating and cooling available are increased and decreased in fixed increments.

4. A method according to claim 3 whereby said increments are determined by separately energizing stages of heating and cooling.

5. A method according to claim 1 additionally comprising the steps of storing the results of said heating and cooling demand comparisons, and employing said stored results of the heating and cooling demand comparisons to control the heating and cooling respectively available.

6. A method according to claim 5 additionally comprising the steps of using the stored results of said heating and cooling comparisons to control the common means for resetting said respective reference values in synchronism with the comparisons of said heating and cooling demands respectively.

7. A method according to claim 5 wherein said heating and cooling memories provide binary outputs to operate the control means.

8. A method according to claim 1, in which said representative heating and cooling demands are obtained by selecting from the heating and cooling demands of each of said zones the greatest of the heating and cooling demands.

* * * * *

UNITED STATES PATENT OFFICE
CERTIFICATE OF CORRECTION

Patent No. 3,933,197　　　　　　　　Dated January 20, 1976

Inventor(s) Darrel E. Zimmer and Paul H. Brace

It is certified that error appears in the above-identified patent and that said Letters Patent are hereby corrected as shown below:

In column 7, lines 8-22, delete "simultaneously---stages"; and line 37, after "enabled" insert -- simultaneously and alternately with respect to NAND gates 148, 151, 154, 156. The other 1 inputs to NAND gates 147, 150, 153 are received respectively as the cooling stages 44 are energized, as will be explained later. It will be seen that the reference voltages at junctions 142, 144 are reset lower by equal increments as the resistors 141-138 are sequentially shorted. The demand for an increase in heating or cooling must therefore be that much greater in order to produce a 1 output from amplifiers 143, 145.

The Q terminal 133 also energizes the base of transistor 117 through conductors 158, 160, so that heating control signals are received over line 126 while the NAND gates 148, 151, 154, 156, corresponding to heating stages--.

Signed and Sealed this

Twenty-sixth Day of October 1976

[SEAL]

Attest:

RUTH C. MASON　　　　　　　　　C. MARSHALL DANN
*Attesting Officer*　　　　　　　*Commissioner of Patents and Trademarks*